US 8,127,012 B2
Feb. 28, 2012

(12) United States Patent
Rai

(10) Patent No.: US 8,127,012 B2
(45) Date of Patent: Feb. 28, 2012

(54) SYSTEM AND METHODS FOR EFFICIENT AND ADEQUATE DATA COLLECTION IN DOCUMENT PRODUCTION ENVIRONMENTS

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1258 days.

(21) Appl. No.: 11/779,418

(22) Filed: Jul. 18, 2007

(65) Prior Publication Data

US 2009/0021773 A1   Jan. 22, 2009

(51) Int. Cl.
*G06F 15/173* (2006.01)
(52) U.S. Cl. ........................................ 709/226; 358/1.15
(58) Field of Classification Search .................. 709/226; 358/1.15
See application file for complete search history.

(56) References Cited

U.S. PATENT DOCUMENTS

| | | | |
|---|---|---|---|
| 5,095,369 A | 3/1992 | Ortiz et al. | |
| 5,513,126 A | 4/1996 | Harkins et al. | |
| 5,559,933 A | 9/1996 | Boswell | |
| 6,223,205 B1 | 4/2001 | Harchol-Balter et al. | |
| 6,509,974 B1 | 1/2003 | Hansen | |
| 6,573,910 B1 | 6/2003 | Duke et al. | |
| 6,631,305 B2 | 10/2003 | Newmark | |
| 6,633,821 B2 | 10/2003 | Jackson et al. | |
| 6,762,851 B1 * | 7/2004 | Lynch et al. | 358/1.15 |
| 6,805,502 B2 | 10/2004 | Rai et al. | |
| 6,925,431 B1 | 8/2005 | Papaefstathiou | |
| 6,961,732 B2 | 11/2005 | Hellemann et al. | |
| 6,993,400 B2 | 1/2006 | Viassolo | |
| 7,016,061 B1 | 3/2006 | Hewitt | |
| 7,051,328 B2 | 5/2006 | Rai et al. | |
| 7,061,636 B2 | 6/2006 | Ryan et al. | |
| 7,065,567 B1 | 6/2006 | Squires et al. | |
| 7,079,266 B1 | 7/2006 | Rai et al. | |
| 7,092,922 B2 | 8/2006 | Meng et al. | |
| 7,092,963 B2 | 8/2006 | Ryan et al. | |
| 7,099,037 B2 | 8/2006 | Clark et al. | |

(Continued)

FOREIGN PATENT DOCUMENTS

CA   2503427 A1   10/2005

(Continued)

OTHER PUBLICATIONS

Harchol-Balter, et al., "On Choosing a Task Assignment Policy for a Distributed Server System," IEEE Journal of Parallel and Distributed Computing, 1999, pp. 204-228.

(Continued)

*Primary Examiner* — Kyung H Shin
(74) *Attorney, Agent, or Firm* — Pepper Hamilton LLP

(57) ABSTRACT

A production process performance reporting system may include a plurality of print job processing resources and a computer-readable storage medium containing programming instructions for performing a method of providing a report of performance metrics in a document production environment. The method may include receiving job size information for print jobs and identifying a print job size distribution for the print jobs. Performance metrics such as, job turnaround time and inter-arrival time may be determined. It may be determined whether the print job size distribution exhibits a heavy-tail characteristic and a performance report may be prepared. If the print job size distribution does not exhibit a heavy-tail characteristic, the plurality of jobs may be processed with the print job processing resources based on the performance report.

21 Claims, 9 Drawing Sheets

U.S. PATENT DOCUMENTS

| | | | |
|---|---|---|---|
| 7,125,179 B1 | 10/2006 | Rai et al. | |
| 7,148,985 B2 | 12/2006 | Christodoulou et al. | |
| 7,152,589 B2 | 12/2006 | Ekeroth et al. | |
| 7,161,699 B2 | 1/2007 | Matoba | |
| 7,200,505 B2 | 4/2007 | Shan | |
| 7,206,087 B2 | 4/2007 | Ryan et al. | |
| 7,382,484 B2 | 6/2008 | Matsukubo et al. | |
| 7,523,048 B1 | 4/2009 | Dvorak | |
| 7,548,335 B2 | 6/2009 | Lawrence et al. | |
| 7,562,062 B2 | 7/2009 | Ladde et al. | |
| 7,576,874 B2 | 8/2009 | Farrell et al. | |
| 7,584,116 B2 | 9/2009 | Kakouros et al. | |
| 7,590,937 B2 | 9/2009 | Jacobus et al. | |
| 7,689,694 B2 | 3/2010 | Kato et al. | |
| 7,761,336 B1 | 7/2010 | Blankenship et al. | |
| 7,949,740 B2 | 5/2011 | Scrafford et al. | |
| 2001/0055123 A1 | 12/2001 | Ryan et al. | |
| 2002/0016803 A1 | 2/2002 | Ryan et al. | |
| 2002/0054344 A1 | 5/2002 | Tateyama | |
| 2002/0071134 A1 | 6/2002 | Jackson et al. | |
| 2002/0198794 A1 | 12/2002 | Williams et al. | |
| 2003/0079160 A1 | 4/2003 | McGee et al. | |
| 2003/0098991 A1 | 5/2003 | Laverty et al. | |
| 2003/0105661 A1 | 6/2003 | Matsuzaki et al. | |
| 2003/0121431 A1 | 7/2003 | Ohno | |
| 2003/0149747 A1 | 8/2003 | Rai et al. | |
| 2003/0200252 A1 | 10/2003 | Krum | |
| 2003/0202204 A1 | 10/2003 | Terrill et al. | |
| 2004/0135838 A1 | 7/2004 | Owen et al. | |
| 2004/0136025 A1 | 7/2004 | Moriyama et al. | |
| 2004/0239992 A1 | 12/2004 | Kawai et al. | |
| 2004/0268349 A1 | 12/2004 | Ramakrishnan et al. | |
| 2005/0065830 A1 | 3/2005 | Duke et al. | |
| 2005/0068562 A1 | 3/2005 | Ferlitsch | |
| 2005/0096770 A1 | 5/2005 | Chua et al. | |
| 2005/0114829 A1 | 5/2005 | Robin et al. | |
| 2005/0134886 A1 | 6/2005 | Farrell et al. | |
| 2005/0151993 A1 | 7/2005 | Gartstein et al. | |
| 2005/0154625 A1 | 7/2005 | Chua et al. | |
| 2005/0275875 A1 | 12/2005 | Jennings | |
| 2006/0031585 A1 | 2/2006 | Nielsen et al. | |
| 2006/0132512 A1 | 6/2006 | Walmsley et al. | |
| 2006/0149755 A1 | 7/2006 | Marshall et al. | |
| 2006/0224440 A1 | 10/2006 | Rai | |
| 2006/0226980 A1 | 10/2006 | Rai et al. | |
| 2007/0008580 A1 | 1/2007 | Tanaka | |
| 2007/0019228 A1 | 1/2007 | Rai et al. | |
| 2007/0070379 A1 | 3/2007 | Rai et al. | |
| 2007/0078585 A1 | 4/2007 | Pomeroy et al. | |
| 2007/0091355 A1 | 4/2007 | Rai | |
| 2007/0092323 A1 | 4/2007 | Lin et al. | |
| 2007/0124182 A1 | 5/2007 | Rai | |
| 2007/0177191 A1 | 8/2007 | Eschbach et al. | |
| 2007/0236724 A1 | 10/2007 | Rai et al. | |
| 2007/0247657 A1 | 10/2007 | Zhang et al. | |
| 2007/0247659 A1 | 10/2007 | Zhang et al. | |
| 2007/0279675 A1* | 12/2007 | Quach et al. | 358/1.15 |
| 2007/0293981 A1 | 12/2007 | Rai | |
| 2008/0013109 A1 | 1/2008 | Chen et al. | |
| 2008/0201182 A1 | 8/2008 | Schneider et al. | |
| 2008/0239368 A1* | 10/2008 | Ota | 358/1.15 |
| 2008/0256541 A1 | 10/2008 | Rai | |
| 2009/0094094 A1 | 4/2009 | Rai et al. | |
| 2009/0313061 A1 | 12/2009 | Rai et al. | |
| 2009/0313063 A1 | 12/2009 | Rai | |
| 2009/0327033 A1 | 12/2009 | Rai et al. | |

FOREIGN PATENT DOCUMENTS

| | | |
|---|---|---|
| EP | 1630663 A2 | 1/2006 |
| EP | 1705556 A1 | 9/2006 |

OTHER PUBLICATIONS

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the 42$^{nd}$ IEEE Conference on Decision and Control, Maui, Hawaii, Dec. 2003.

Zheng et al., "Finding Optimal (s,S) Policies Is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al.; "Computing Optimal (s,S) Inventory Policies", Management Science, vol. 11, No. 5, Series A., Sciences, Mar. 1965, pp. 525-552.

Simchi Levi, et al. "Designing & Managing The Supply Chain: Concepts, Strategies and Cases", Second Edition, 2000, McGraw Hill Higher Education, New York, New York.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models", 2006, Chapman & Hall/CRC, Boca Raton, Florida.

* cited by examiner

SYSTEM AND METHODS FOR EFFICIENT AND ADEQUATE DATA COLLECTION IN DOCUMENT PRODUCTION ENVIRONMENTS

CROSS REFERENCE TO RELATED APPLICATIONS

This application is related to co-pending U.S. patent application Ser. Nos. 11/779,392; 11/779,437; 11/779,454; 11/779,464; 11/779,494; U.S. patent application Ser. No. 11/779,512 and Ser. No. 10/946,756 filed Sep. 22, 2004.

BACKGROUND

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize print jobs arriving at a document production environment and route the print jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety. Methods for distributing jobs to a receiver on a network using devices are known in the art and are described in, for example, U.S. Pat. No. 5,513,126 to Harkins et al., the disclosure of which is incorporated by reference in its entirety.

It is common for print shops to receive print jobs having variable job sizes. Problems arise when a wide distribution of job sizes exists. This may be referred to as a heavy-tailed distribution. Heavy-tailed distributions usually require significant data before the mean distribution can be computed with accuracy. Even when large sets of data are collected, however, it can be difficult to compute an accurate average job size for heavy-tailed distributions.

Transaction print environments that process jobs having a heavy-tailed job-size distribution tend to have inefficient job flows. This is because these environments typically handle very large and very small jobs that are all part of one job pool. It is likely that several small jobs may be delayed if they are queued behind a very large job. Similarly, large jobs can experience flow interruptions if several small jobs requiring multiple setups are ahead of the large jobs in the queue.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a production process performance reporting system may include a plurality of print job processing resources and a computer-readable storage medium containing one or more programming instructions for performing a method of providing a report of performance metrics in a document production environment. The method may include receiving job size information for a plurality of print jobs to be performed by one or more print job processing resources in one or more document production environments and identifying a print job size distribution for the plurality of print jobs. One or more performance metrics such as, job turnaround time, job inter-arrival time, average job size, resource utilization and process efficiency, may be determined. The performance metrics may each relate to at least a portion of the one or more print job processing resources. It may be determined whether the print job size distribution exhibits a heavy-tail characteristic and a performance report may be prepared. The performance report may include the one or more determined performance metrics, and, if the print job size distribution exhibits a heavy-tail characteristic, an indication that the one or more determined performance metrics were calculated using a heavy-tailed job size distribution. The performance report may be printed and if the print job size distribution does not exhibit a heavy-tail characteristic, the plurality of jobs may be processed with the one or more print job processing resources based on the performance report.

In an embodiment, a production process performance reporting system may include a plurality of print job processing resources, a data collection system operable to coordinate the flow of print jobs to the print job processing resources and a computer-readable storage medium containing one or more programming instructions for performing a method of providing a report of performance metrics in a document production environment. The method may include receiving, by the data collection system, job size information for a plurality of print jobs to be performed by one or more print job processing resources in one or more document production environments and identifying a print job size distribution for the plurality of print jobs. The data collection system may determine one or more performance metrics such as job turnaround time, job inter-arrival time, average job size, resource utilization and process efficiency. The one or more performance metrics may each relate to at least a portion of the one or more print job processing resources. The data collection system may determine whether the print job size distribution exhibits a heavy-tail characteristic. If so, a performance report of the one or more determined performance metrics may be prepared. The performance report may indicate that the one or more determined performance metrics were determined using a heavy-tailed job size distribution. The performance report may be distributed to a user.

In an embodiment, a computer-implemented method of providing a report of performance metrics in a production process may include receiving, with a computer, job size information for a plurality of jobs to be performed by one or more resources in one or more production environments and identifying a job size distribution for the plurality of jobs. One or more performance metrics, such as job turnaround time, job inter-arrival time, average job size, resource utilization and process efficiency, may be determined with the computer. The performance metrics may each relate to at least a portion of the one or more resources. It may be determined with the computer whether the job size distribution exhibits a heavy-tail characteristic. A performance report may be prepared that includes the one or more determined performance metrics, and, if, the job size distribution exhibits a heavy-tail characteristic, an indication that the one or more determined performance metrics were calculated using a heavy-tailed job size distribution. The performance report may be printed and, if the print job size distribution does not exhibit a heavy-tail characteristic, the plurality of jobs may be processed with the one or more print job processing resources based on the performance report. In an embodiment, a computer-implemented method of providing a report of performance metrics in a production process may include receiving, by a computer, job size information for a plurality of jobs to be performed by one or more resources in one or more production environments and identifying a job size distribution for the plurality of jobs. One or more performance metrics, such as job turn-around time, job inter-arrival time, average job size, resource utilization and process efficiency may be determined with a computer. The performance metrics may each relate to at least a portion of the one or more resources. It may be determined with the computer whether the job size distribution exhibits a heavy-tail characteristic. If so, a performance report of the one or more determined performance metrics may be prepared. The performance report may indicate that the one or more determined performance metrics were determined using a heavy-tailed job size distribution. The performance report may be distributed to a user.

DETAILED DESCRIPTION

For purposes of the discussion below, a "print shop" refers to an entity that includes a plurality of document production resources, such as printers, cutters, collators and the like. A print shop may be a freestanding entity, including one or more print-related devices, or it may be part of a corporation or other entity. Additionally, the print shop may communicate with one or more servers by way of a local area network, a wide area network, such as the Internet or the World Wide Web or the like.

A "job" refers to a logical unit of work that is to be completed for a customer. A job may include one or more print jobs from one or more clients. A production system may include a plurality of jobs. Although the disclosed embodiments pertain to document production systems, the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

Figure 1:
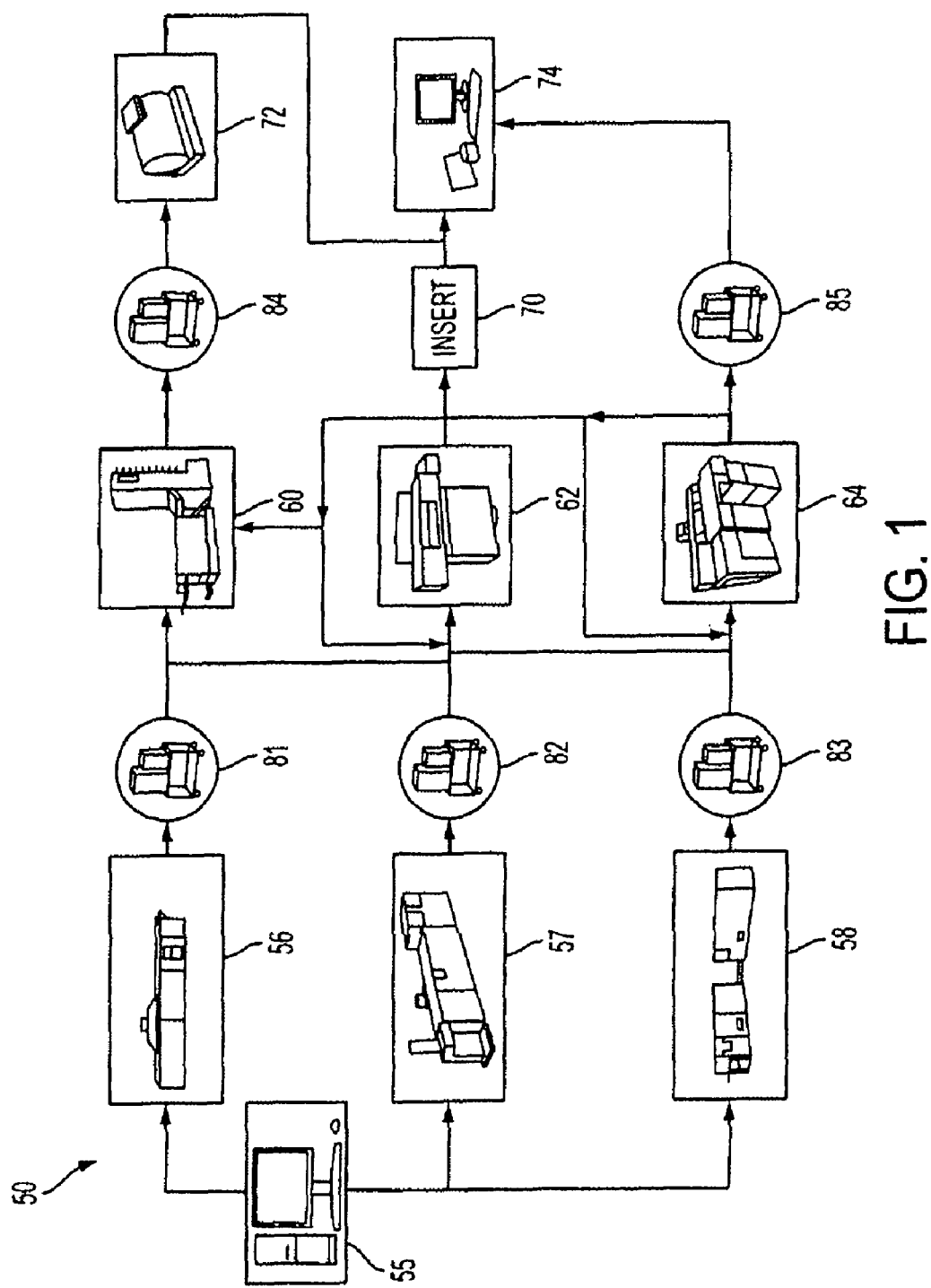
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

A job size distribution may describe a probability distribution of a real-valued random variable. Examples of types of job size distributions may include normal distributions, exponential distributions, logarithmic distributions, cumulative distributions and the like.

A group of jobs having a large job size distribution may be referred to as having a heavy-tailed distribution. A heavy-tailed distribution may be characterized as a job size distribution processing a tail that decays slowly. In other words, as the value of the random variable increases, a probability associated with the random variable decreases. Heavy-tailed distributions may have many small jobs mixed with a few very large jobs. As such, even though the majority of the job sizes are small, a substantial contribution to the mean or variance for the jobs considered in the distribution may come from the few large jobs. Accordingly, the difference between the mean and median may be pronounced for heavy-tailed distributions.

In an embodiment, X may be a random variable with a cumulative density function ("CDF"), $F(x)=P[X \leq x]$. The area under the CDF from 0 to X as X approaches infinity may be equal to one. A complementary CDF("CCDF") may be represented by $F_c(x)=P[X>x]$, where the CCDF=1−CDF. The CDF may be heavy-tailed if the CCDF$\sim cx^{-\alpha}$ where $\alpha$ is between zero and two. As such, $$\lim_{x \to \infty} \frac{d \log F_1(x)}{d \log x} = -\alpha$$

Accordingly, the decay rate of a CDF for large job sizes may be equal to $\alpha$. The decay rate of the CDF may be represented by the slope of the CDF.

Figure 2:
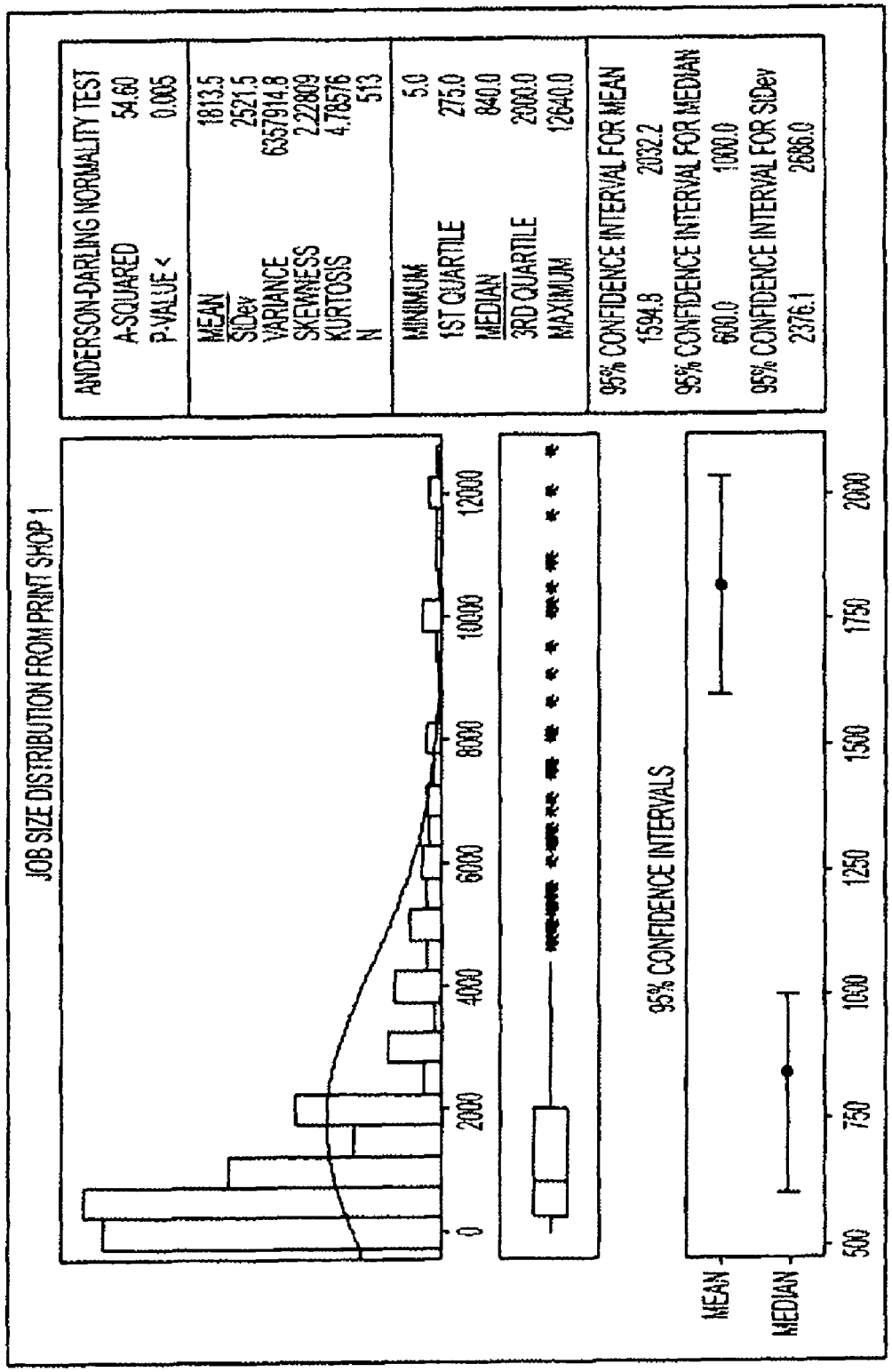
FIG. 2 depicts a graphical representation of a first job size distribution from a production environment according to an embodiment.
Figure 3:
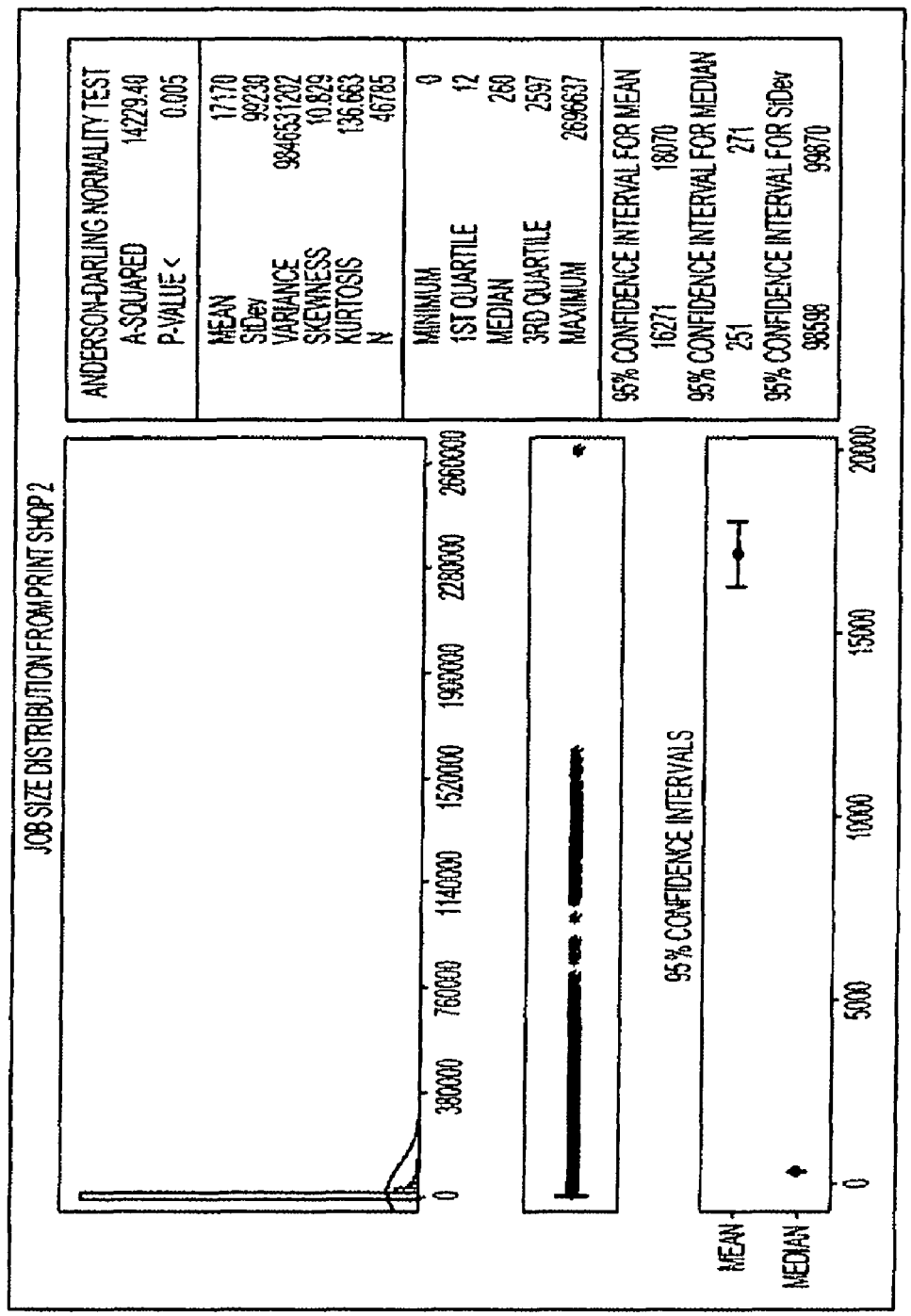
FIG. 3 depicts a graphical representation of a second job size distribution from another production environment according to an embodiment.
Figure 4:
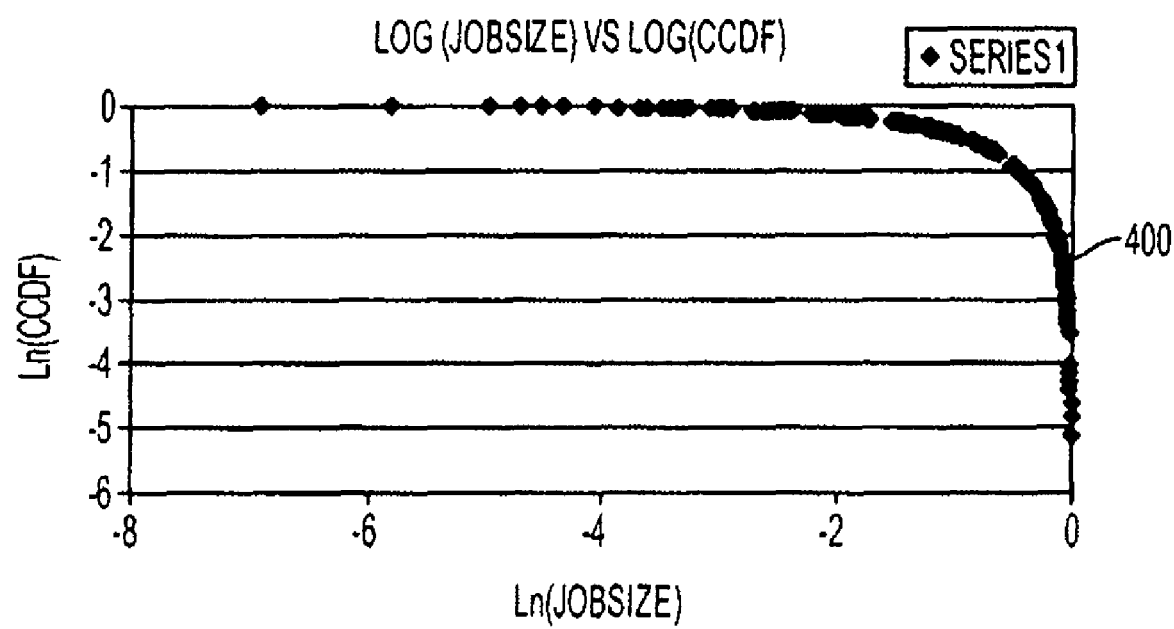
FIG. 4 depicts a plot of ln(CCDF) versus ln(job size) for a thin-tailed job size distribution, such as that illustrated in FIG. 2 according to an embodiment.
Figure 5:
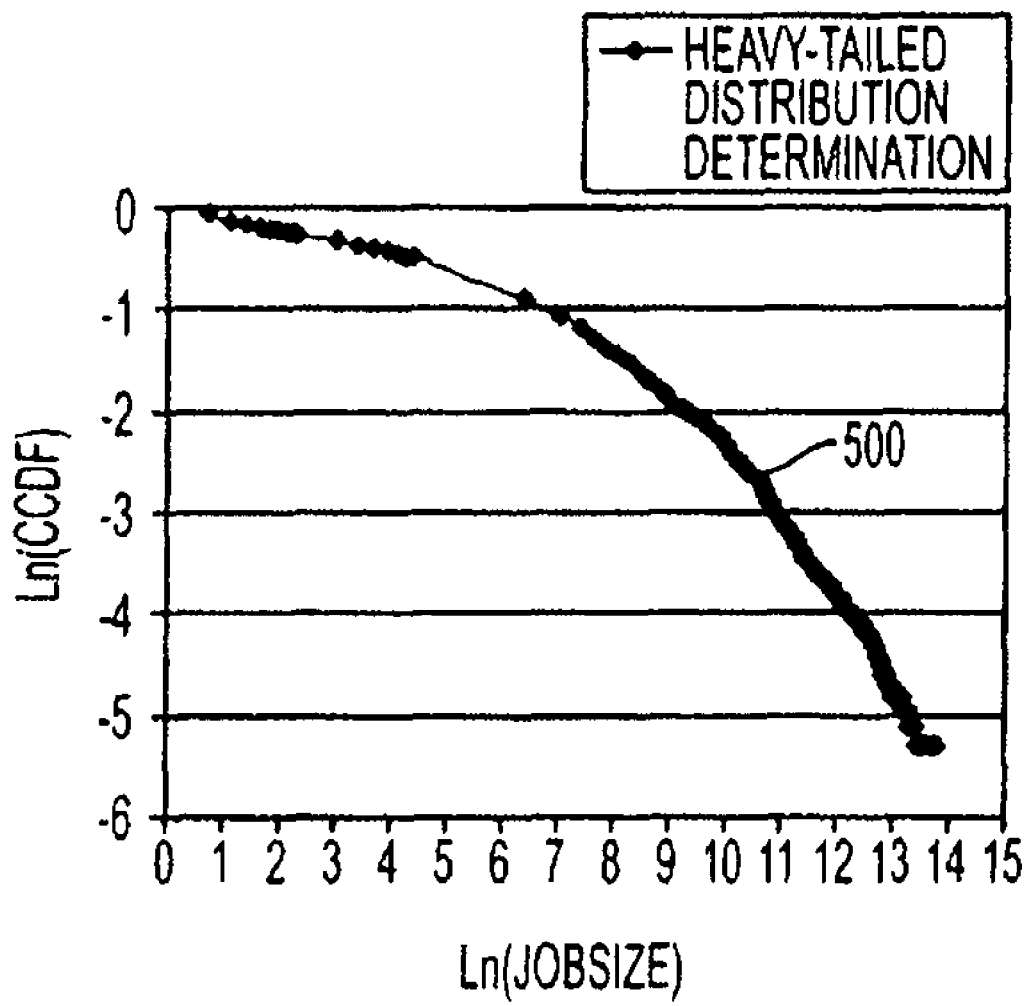
FIG. 5 depicts a plot of ln(CCDF) versus ln(job size) for a heavy-tailed job size distribution, such as that illustrated in FIG. 3 according to an embodiment.

FIG. 2 illustrates a graphical representation of a first job size distribution (JSD1) from a production environment. FIG. 3 illustrates a graphical representation of a second job size distribution (JSD2) from a different production environment. FIG. 4 illustrates a plot of the natural log ("ln") of CCDF versus ln(job size) for JSD1. FIG. 5 illustrates a plot of ln(CCDF) versus ln(job size) for JSD2.

As illustrated by FIG. 4, the $$\lim_{x \to \infty} \frac{\ln(CCDF)}{\ln(x)},$$

or the slope of the curve 400 as x approaches very large values, where x represents job size, is approximately −6.4 for large job sizes. As illustrated in FIG. 5, the slope of the curve 500 is approximately −1.26 for large job sizes. In other words, for JSD1, $\alpha \sim 6.4$ and for JSD2, $\alpha \sim 1.26$. As such, JSD1 may be considered a thin-tailed distribution because $\alpha \sim 6.4$ (i.e., outside the range of minimum and maximum decay values, i.e., $0 < \alpha < 2$ range for heavy-tailed distributions). However, JSD2 may be considered a heavy-tailed distribution, because $\alpha \sim 1.26$ (i.e., inside the range of minimum and maximum decay values, i.e., $0 < \alpha < 2$ range for heavy-tailed distributions).

In an embodiment, the job size distribution may be tested for a heavy-tail characteristic by computing a decay rate of a complementary cumulative density function for the job size distribution for very large values of job sizes.

A heavy-tailed distribution may require significantly more data than a normal distribution before an accurate mean may be calculated. This is because, for normal distributions, the sample mean converges to the population mean inversely as the square root of the sample size. As such, for large sample sizes, the sample mean may be used as the population mean. The sample mean for heavy-tailed distributions, on the other hand, may converge to the population means inversely as $n^{1-(1/\alpha)}$. As $\alpha$ approaches 1, the convergence rate may be very poor and the rages done on heavy-tailed distributions may be inaccurate.

Figure 6:
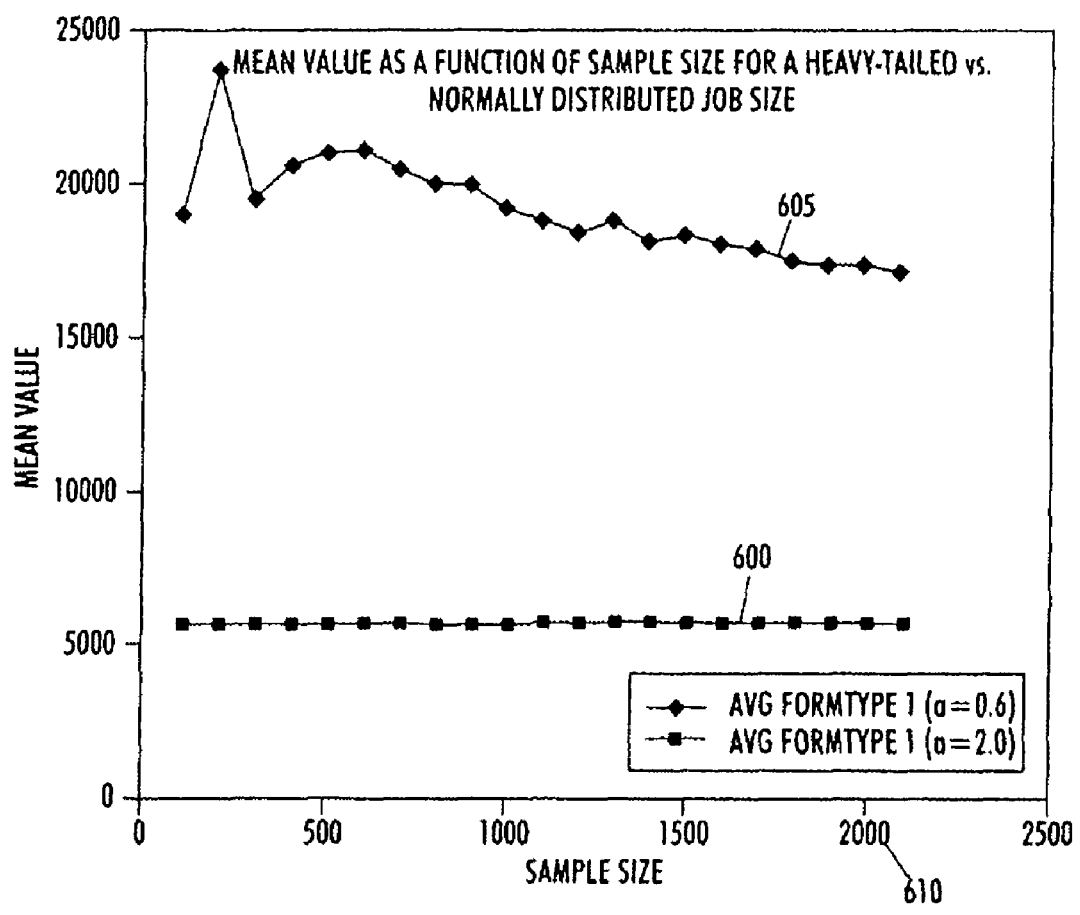
FIG. 6 illustrates the behavior of a heavy-tailed distribution as compared to a thin-tailed distribution over a range of job sizes.

This problem is illustrated by FIG. 6, which shows a plot of the sample mean for a normal distribution as compared to a heavy-tailed distribution. The index of stability, $\alpha$, for the heavy-trailed distribution 605 is 0.6. In comparison, the normal distribution 600 has an index of stability $\alpha = 2$. The index of stability may represent the decay rate of a complementary cumulative density function or the like. In an embodiment, the index of stability may be compared to a threshold value. For example, if the index of stability of a CCDF is less than a threshold value, the job size distribution may be identified as a heavy-tailed distribution. Similarly, if the index of stability of a CCDF exceeds the threshold value, the job size distribution may be identified as a thin-tailed distribution. In an embodiment, the threshold may be a value in the range of zero to two.

FIG. 6 illustrates the behavior of a heavy-tailed distribution 605 as compared to a thin-tailed distribution 600 (the normal distribution) over a range of job sizes. As the job size increases, the means of the two distributions may start approaching the population means. FIG. 6 shows a plot of the mean for a normal distribution 600 and a heavy-tailed distribution 605. As illustrated by FIG. 6, the mean quickly converges for the normal distribution 600. However, the mean of the heavy-tailed distribution 605 takes significantly longer to converge. As illustrated by FIG. 6, even after receiving 2000 datapoints 610, the sample mean does not show convergence.

In an embodiment, if a distribution is determined to be a heavy-tailed distribution, the jobs in the distribution may be grouped into a plurality of subgroups such that at least one subgroup is not a heavy-tailed distribution. A job size distribution may be split into two or more subgroups by selecting a threshold job size and calculating the $\alpha$ associated with the distribution to the right of the threshold job size. For example, referring back to FIG. 3, if a job size threshold of 20,000 is chosen, then a left-most distribution segment may range from 0 to 20,000 and a right-most distribution segment may range from 20,000 to 2,696,637. Because the left-most distribution segment is bounded, it is not a heavy-tailed distribution. Because, in practice, the random variable is unlikely to assume infinite values, the job set may be finite thus producing a finite distribution. As such, the variability of the right-most distribution may decrease as the threshold value increases, and the right-most distribution segment may be approximated as a thin-tailed distribution. As a job size threshold is increased, a distribution may become less and less similar to a heavy-tailed distribution because the variability associated with the distribution decreases.

Figure 7:
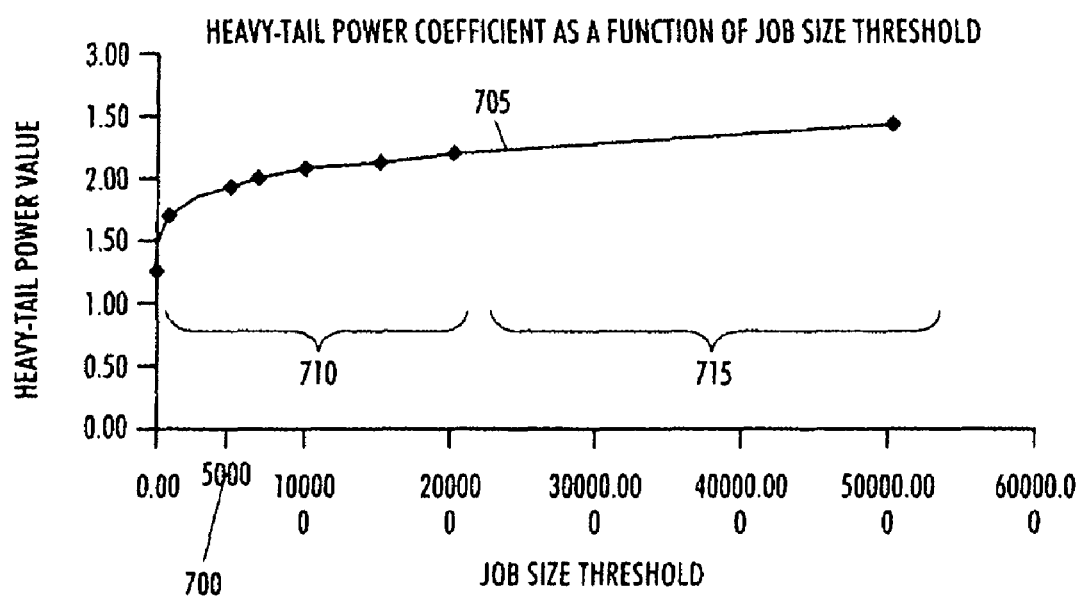
FIG. 7 depicts an exemplary plot of decay rate of a job size distribution versus certain job size threshold values according to an embodiment.

FIG. 7 illustrates a plot of the decay rate of the job size distribution depicted in FIG. 3 versus certain job size threshold values. As illustrated by FIG. 7, as the job size threshold increases, so does the decay rate. Somewhere above a job size threshold of 5,000 700, the resulting distribution 705 is no longer heavy-tailed because the decay rate is greater than or equal to two. As such, if 20,000 is selected as the job size threshold, the left-most distribution segment 710 (i.e., from 0 to 20,000) may be thin-tailed because the distribution is bounded while the left-most distribution segment 715 (i.e., from 20,000 to 50,000) may also mimic thin-tailed because the decay rate associated with the segment is greater than two.

In an embodiment, a data collection system may prepare a report of performance metrics where each metric may relate to at least a portion of one or more resources in the production environment. The metrics may measure job turnaround time, job inter-arrival time, average job size, resource utilization, process efficiency and/or the like. Job turnaround time may refer to the time required to completely process a job. Job inter-arrival time may refer to the time that has elapsed between job arrivals. Average job size may refer to the mean job size of the plurality of jobs in the job size distribution. Resource utilization may refer to the percentage of time that a resource is performing jobs over a time period. Process efficiency may refer to how efficient a resource is in performing assigned jobs.

In an embodiment, the data collection system may determine whether any of the metrics were calculated using an invalid job size distribution. An invalid job size distribution may be one that produces invalid measures. For example, a job size distribution may be invalid if it exhibits a heavy-tail characteristic, has properties similar to a heavy-tail distribution or the like. If a computed metric is determined to be invalid, a report may indicate that the metric was calculated using an invalid job size distribution, such as a heavy-tailed job size distribution. Based on the report, subsequent decisions affecting the scheduling and routing of jobs may be made. For example, if a job size distribution exhibits a heavy-tail characteristic, it may be processed using an autonomous cell that is designed to process specific ranges of job sizes.

In an embodiment, a report may only be generated for those job size distributions that produce one or more invalid metrics. For example, if a job size distribution is determined to be thin-tailed or normally distributed, a report may not be generated.

In another embodiment, performance metrics may be collected from a plurality of production environments. Accordingly, the data collection system may determine whether the metrics calculated using an aggregate job size distribution that includes jobs from one or more environments among the plurality of production environments is invalid.

In an embodiment, if a report includes one or more metrics that were determined using an underlying heavy-tailed distribution, a user may utilize the report information in various ways. For example, a heavy-tailed inter-arrival time distribution may alert a user that performance characteristics determined by queuing network models that utilize the distribution may lead to inaccurate results. A queuing network model may approximate real queuing situations or systems so that queuing behavior may be analyzed. Often, queuing network models utilize a coefficient of variation of inter-arrival time. A coefficient of variation may be the ratio of the standard deviation of the distribution to the mean of the distribution. For heavy-tailed distributions, if the coefficient of variation is invalid, performance metric computations utilizing the metrics may also be invalid. A G/G/m queuing model may be used as an example, where the first 'G' represents a general inter-arrival time distribution, the second 'G' represents a general processing time distribution and the 'm' represents identical servers. A mean waiting time of a G/G/m queuing model, may be represented by:

$$\left[\frac{c_a^2 + c_e^2}{2}\right]\left[\frac{u\sqrt{2(m+1)} - 1}{m(1-u)}\right] t_e$$

where $c_a$ is the coefficient of variation of inter-arrival time, $c_e$ is the coefficient of variation of production time on a printer, u is the average utilization of the printer, m is the number of printers and $t_e$ is the average processing time on a printer.

Because heavy-tailed distributions may have very high variances that do not converge as the sample size grows, if the underlying distribution used for calculating $c_a$ and $c_e$ is heavy-tailed, then these coefficient of variation values are likely invalid. As such, the estimate of mean queue waiting time and optimization studies based on invalid performance metrics is likely invalid. Optimization studies based on invalid performance metric computations may also be invalid. As such, providing alerts to users of invalid data may be beneficial.

In another embodiment, a user may be alerted to the existence of a heavy-tailed distribution in performing hypothesis testing. Hypothesis testing may refer to a method of determining whether two job size distributions are statistically different. A metric derived from a heavy-tailed distribution that is used in a hypothesis test may not provide a statistically accurate result. For example, mean process cycle efficiency measures may be determined using a heavy-tailed distribution both before and after process changes are made. The two distributions may then be subjected to a hypothesis test to determine whether the process changes affected any process cycle efficiency metrics. Because the measures were calculated using a heavy-tailed distribution, however, the results of the hypothesis test may yield invalid conclusions.

In another embodiment, a user may be alerted to the existence of a heavy-tailed distribution in the determination of process capability. Process capability refers to the ability of a process to operate within one or more defined parameters, such as an upper limit, a lower limit or the like. For example, a turnaround time distribution may exhibit a heavy-tailed characteristic. If a service level agreement provides that only a certain percentage of jobs can have job processing times that exceed an upper specification limit, then achieving this percentage may be unlikely using a heavy-tailed turnaround time distribution because such a distribution has a significant probability of having an actual turnaround time that exceeds the percentage. As such, a user may be alerted to use alternative scheduling policies that take into account the heavy-tailed characteristics or to use service level contracts that are more flexible.

In an embodiment, once generated, the report may be distributed to one or more users. The data collection system may distribute a performance report to a user indicating that the present job size distribution exhibits a heavy-tail characteristic. The performance report may be distributed to users by printing, emailing, faxing, scanning or the like. In an embodiment, the performance report may be distributed to a remote user by a communications network or the like.

Figure 8:
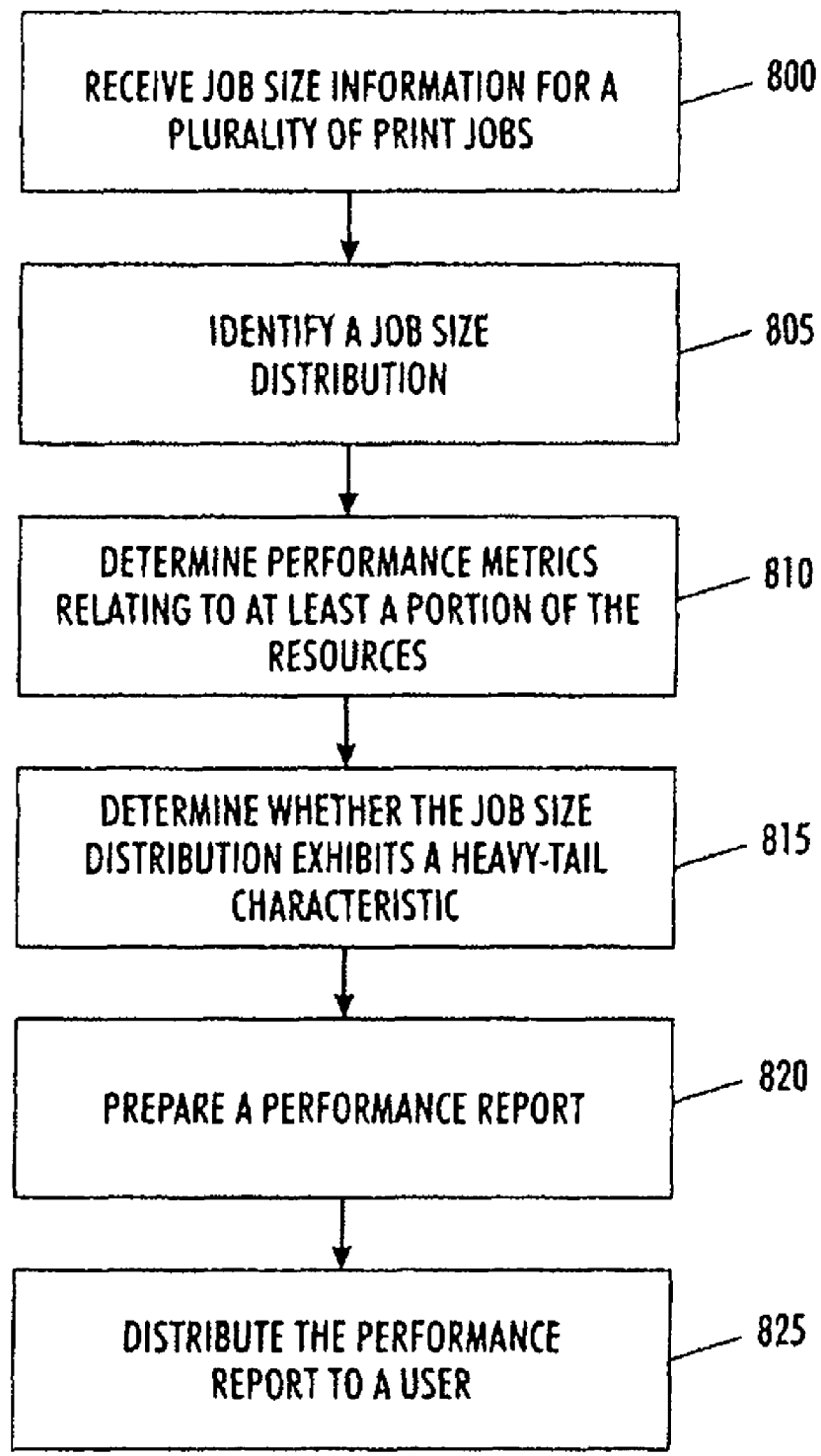
FIG. 8 depicts an exemplary flow chart of providing a report of performance metrics according to an embodiment.

FIG. 8 depicts an exemplary flow chart of providing a report of performance metrics according to an embodiment. Job size information for a plurality of print jobs may be received 800 and a job size distribution may be identified 805 for the plurality of print jobs. The data collection system may determine 810 performance metrics relating to at least a portion of the resources. The performance metrics may include job turnaround time, average job size, resource utilization, process efficiency and the like. The data system may determine 815 whether the job size distribution exhibits a heavy-tail characteristic. If so, a performance report containing the determined performance metrics and an indication that the metrics were determined using a heavy-tailed distribution may be prepared 820. The performance report may then be distributed 825 to a user.

Figure 9:
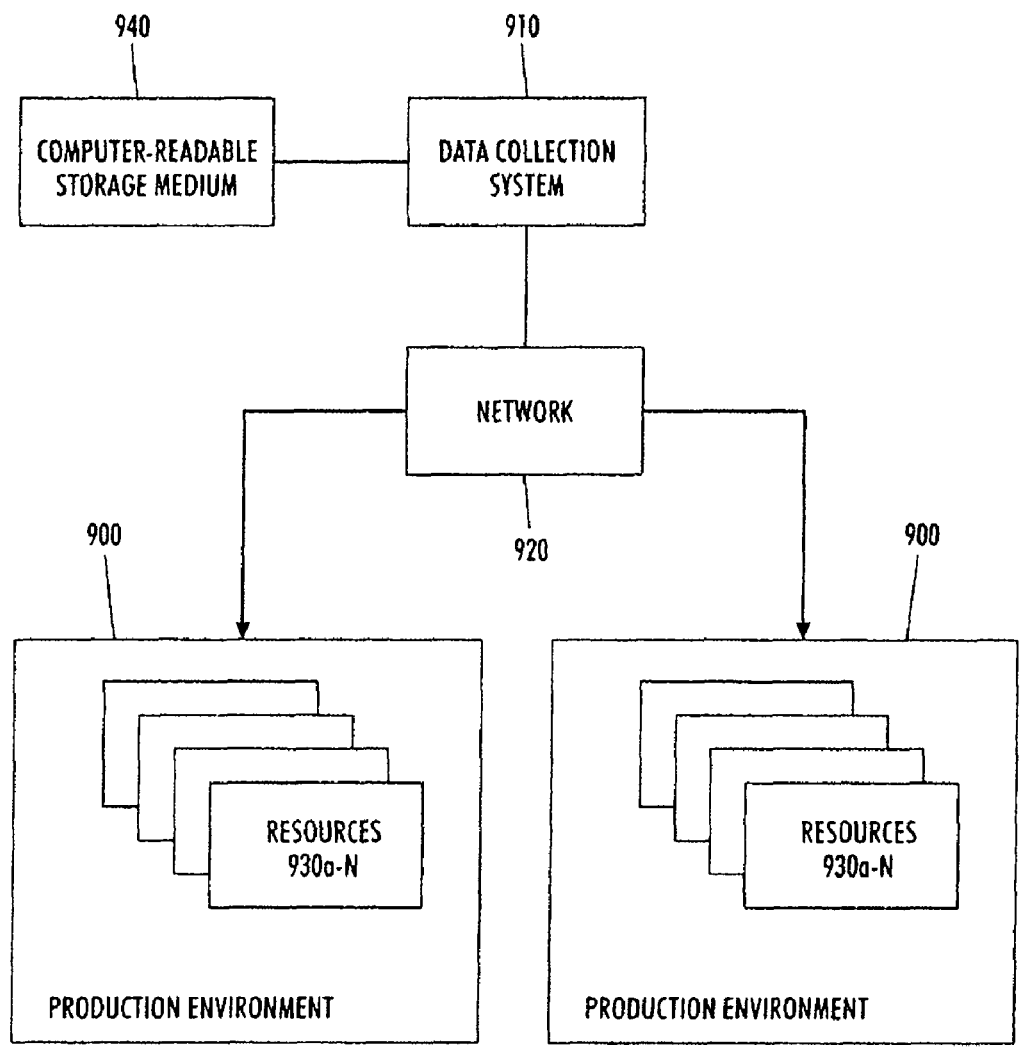
FIG. 9 depicts an environment suitable for providing a report of performance metrics in a production process according to an embodiment.

FIG. 9 depicts an environment suitable for practicing the illustrative embodiments. A data collection system 910 may be in communication with a non-transitory computer-readable storage medium 940 and one or more production environments 900 via a network 920. The production environment 900 may include resources 930a-N such as a printer, a copier, a binder, a hole-punch, a collator, a sealer or any other equipment used to process jobs. The collection system 910 may be implemented on a stand-alone computer system or may be integrated into the resources. The data collection system 910 may also be implemented by distributed components such as separate electronic devices. A network 920 may interconnect the resources 930a-N with the data collection system 910, as illustrated in FIG. 9. The network 920 may include a local area network (LAN) or a wide area network (WAN), such as the Internet, the World Wide Web or the like. The network may also be formed by communication links that interconnect the data collection system 910 and the resources 930a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A production process performance reporting system comprising:
   a plurality of print job processing resources; and
   a non-transitory computer-readable storage medium containing one or more programming instructions for performing a method of providing a report of performance metrics in a document production environment, the method comprising:

receiving job size information for a plurality of print jobs to be performed by one or more print job processing resources in one or more document production environments, identifying a print job size distribution for the plurality of print jobs, determining one or more of the following performance metrics: job turnaround time, job inter-arrival time, average job size, resource utilization and process efficiency, wherein the one or more performance metrics each relate to at least a portion of the one or more print job processing resources, determining that the print job size distribution exhibits a heavy-tail characteristic if a large variance of print job sizes exists among the plurality of print jobs associated with the print job size distribution, preparing a performance report comprising:
the one or more determined performance metrics, and
if, the print job size distribution exhibits a heavy-tail characteristic, an indication that the one or more determined performance metrics were calculated using a heavy-tailed job size distribution, printing the performance report, and if the print job size distribution does not exhibit a heavy-tail characteristic, processing the plurality of jobs with the one or more print job processing resources based on the performance report.

2. The system of claim 1 further comprising:
a data collection system operable to coordinate the flow of print jobs to the print job processing resources.

3. The system of claim 1, wherein the one or more programming instructions for identifying a print job size distribution comprises one or more programming instructions for:

identifying a print job size distribution for a plurality of print jobs to be performed by one or more print job processing resources in a document production environment.

4. The system of claim 1, wherein the one or more programming instructions for determining whether the print job size distribution exhibits a heavy-tail characteristic comprises one or more programming instructions for:

determining a complementary cumulative density function for the print job size distribution;

if an index of stability of the complementary cumulative density function is less than a threshold value, identifying the print job size distribution as a heavy-tailed distribution; and if the index of stability of the complementary cumulative density function exceeds a threshold, identifying the print job size distribution as a thin-tailed distribution.

5. The system of claim 4, wherein the computer-readable storage medium further comprises one or more programming instructions for setting the threshold value in a range of 0-2.

6. A production process performance reporting system comprising:

a plurality of print job processing resources;

a data collection system operable to coordinate the flow of print jobs to the print job processing resources; and a non-transitory computer-readable storage medium containing one or more programming instructions for performing a method of providing a report of performance metrics in a document production environment, the method comprising:

receiving, by the data collection system, inter-arrival time information for a plurality of print jobs to be performed by one or more print job processing resources in one or more document production environments;

identifying an inter-arrival time distribution for the plurality of print jobs;

determining, by the data collection system, one or more performance metrics associated with processing the plurality of print jobs by one or more of the print job processing resources;

determining, by the data collection system, that the inter-arrival time distribution exhibits a heavy-tail characteristic; and if the inter-arrival time distribution exhibits a heavy-tail characteristic:

preparing a performance report, wherein the performance report indicates that one or more performance characteristics determined by one or more queuing network models that used the inter-arrival time distribution may be inaccurate, and distributing the performance report to a user.

7. The system of claim 6, wherein the computer-readable storage medium further comprises one or more processing instructions for:

performing a hypothesis test, using the performance report, to determine whether one or more results of the hypothesis test is invalid.

8. The method of claim 6, wherein the computer-readable storage medium further comprises one or more programming instructions for:

using the performance report to determine whether the inter-arrival time distribution affects an ability of a production environment to operate within one or more defined parameter values.

9. The system of claim 6, wherein the one or more programming instructions for determining whether the print job size distribution exhibits a heavy-tail characteristic comprises one or more programming instructions for:

determining a complementary cumulative density function for the inter-arrival time distribution;

if an index of stability of the complementary cumulative density function is less than a threshold value, identifying the inter-arrival time distribution as a heavy-tailed distribution; and if the index of stability of the complementary cumulative density function exceeds the threshold value, identifying the inter-arrival time distribution as a thin-tailed distribution.

10. The system of claim 9, wherein the computer-readable storage medium further comprises one or more programming instructions for setting the threshold value in a range of 0-2.

11. The system of claim 6, wherein the one or more programming instructions for distributing the performance report comprises one or more programming instructions for:

distributing the performance report to one or more remote users by a communications network.

12. The system of claim 6, wherein the one or more programming instructions for distributing the performance report comprises one or more programming instructions for one or more of printing, faxing, emailing and scanning the performance report to a user.

13. A computer-implemented method of providing a report of performance metrics in a production process, the method comprising:

receiving, with a computer, turnaround time information for a plurality of jobs to be performed by one or more resources in one or more production environments;

identifying a turnaround time distribution for the plurality of jobs;

determining, with the computer, one or more performance metrics associated with processing the plurality of print jobs by one or more of the resources;

determining, with the computer, that the turnaround time distribution exhibits a heavy-tail characteristic;

preparing a performance report comprising:
the job turnaround time, and
if the job size distribution exhibits a heavy-tail characteristic, an indication that: one or more performance characteristics associated with a determination of process capability for the turnaround time distribution may be inaccurate;

printing the performance report; and if the print job size distribution does not exhibit a heavy-tail characteristic, processing the plurality of jobs with the one or more print job processing resources based on the performance report.

14. The method of claim 13, wherein determining that the turnaround time distribution exhibits a heavy-tail characteristic comprises:

determining a complementary cumulative density function for the turnaround time distribution;

if an index of stability of the complementary cumulative density function is less than a threshold value, identifying the turnaround time distribution as a heavy-tailed distribution; and if the index of stability of the complementary cumulative density function exceeds the threshold value, identifying the turnaround time distribution as a thin-tailed distribution.

15. The method of claim 14, further comprising setting the threshold value in a range of 0-2.

16. A computer-implemented method of providing a report of performance metrics in a production process, the method comprising:

receiving, by a computer, job size information for a plurality of jobs to be performed by one or more resources in one or more production environments;

identifying a job size distribution for the plurality of jobs;

determining, with the computer, one or more of the following performance metrics: job turnaround time, job inter-arrival time, average job size, resource utilization and process efficiency, wherein the one or more performance metrics each relate to at least a portion of the one or more resources;

determining, with the computer, that the job size distribution exhibits a heavy-tail characteristic if a large variance of print job sizes exists among the plurality of print jobs associated with the print job size distribution; and if the print job size distribution exhibits a heavy-tail characteristic:

preparing a performance report of the one or more determined performance metrics, wherein the performance report indicates that:
the one or more determined performance metrics were determined using a heavy-tailed job size distribution, and
in response to one or more of the performance metrics being used in a hypothesis test, the hypothesis test may not provide a statistically accurate result, and distributing the performance report to a user.

17. The method of claim 16, further comprising:
using the performance report to determine whether the job size distribution affects an ability of a production environment to operate within one or more defined parameter values.

18. The method of claim 16, wherein determining whether the job size distribution exhibits a heavy-tail characteristic comprises:

determining a complementary cumulative density function for the job size distribution;

if an index of stability of the complementary cumulative density function is less than a threshold, identifying the print job size distribution as a heavy-tailed distribution; and if the index of stability of the complementary cumulative density function exceeds a threshold, identifying the print job size distribution as a thin-tailed distribution.

19. The method of claim 18, further comprising setting the threshold value in a range of 0-2.

20. The method of claim 16, wherein distributing the performance report comprises:
distributing the performance report to one or more remote users by a communications network.

21. The method of claim 16, wherein distributing the performance report comprises one or more of printing, faxing, emailing and scanning the performance report to a user.

* * * * *